M. GUTHRIE.
Bee Hive.
No. 59,593. Patented Nov. 13, 1866.
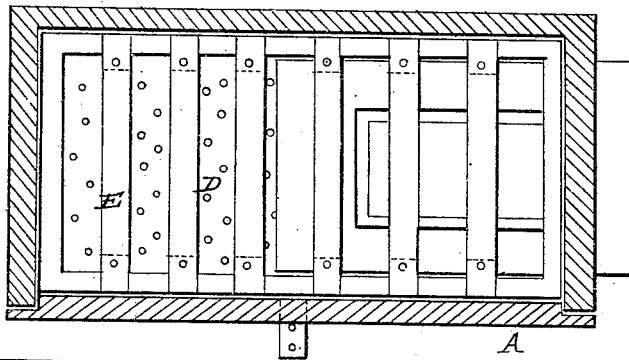
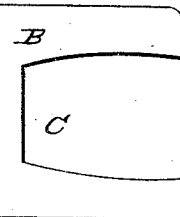
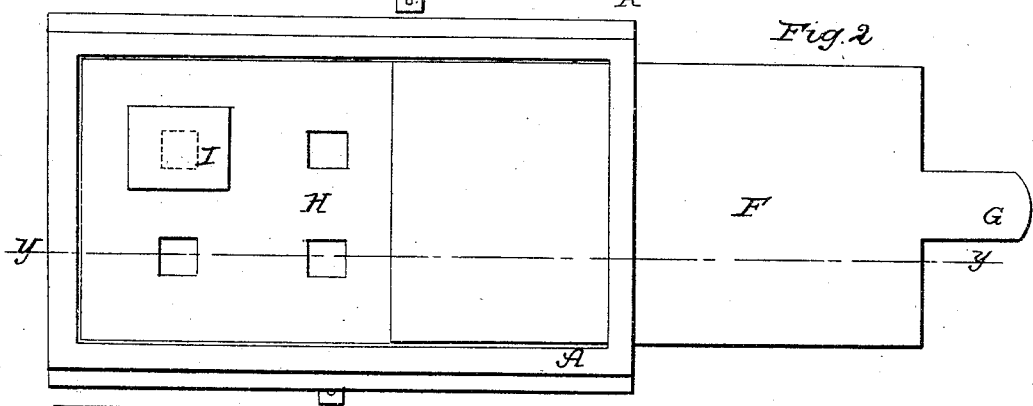
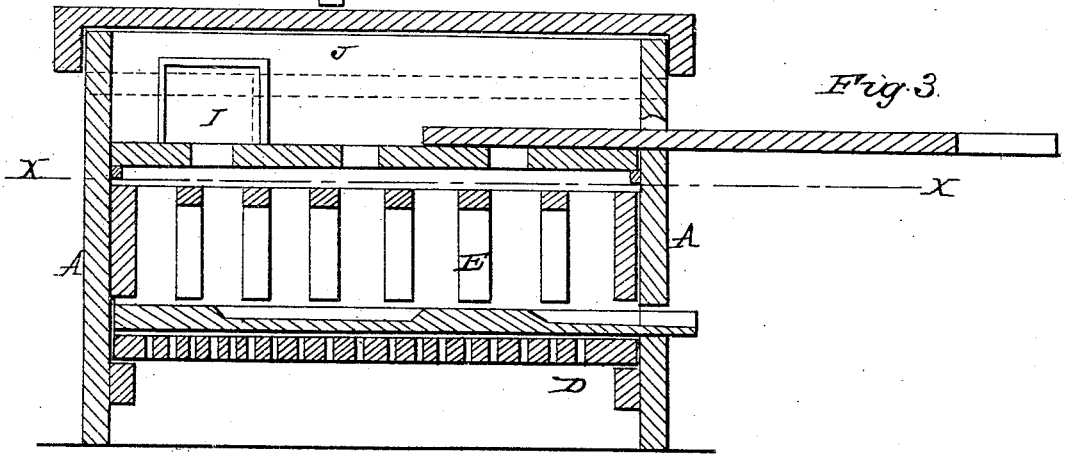

UNITED STATES PATENT OFFICE.

MOSES GUTHRIE, OF CLIFTON, IOWA.

IMPROVEMENT IN BEE-HIVES.

Specification forming part of Letters Patent No. 59,593, dated November 13, 1866.

*To all whom it may concern:*

Be it known that I, MOSES GUTHRIE, of Clifton, Louisa county, and State of Iowa, have invented a new and Improved Bee-Hive; and I do hereby declare that the following is a full, clear, and exact description thereof, which will enable others skilled in the art to make and use the same, reference being had to the accompanying drawings, forming part of this specification.

The nature of my invention consists in so constructing a bee-hive that the bees may be kept in different apartments or may be allowed to work in all, as may be desired.

To enable others skilled in the art to make and use my invention, I will proceed to describe its construction and operation.

Figure 1 is a top section from the line X X. Fig. 2 is a top-plan view with the cover off. Fig. 3 is a vertical sectional elevation.

Letters of like name and kind refer to like parts in each of the figures.

A represents the box or outer walls of my improved hive, which is made of wood, nearly cubic in form, and of any desired dimensions. B represents one of the bottoms or partitions, which, when in its proper position, projects a little from the end of the box, sufficient for a step or platform, and is rabbeted out at the end for the purpose of admitting the bees, as seen at c. This partition c may be drawn from the hive and entirely removed, if desired. It is represented in the figure as being partly drawn out, for the purpose of showing the perforated bottom D, which forms the bottom of the box or drawer E. This perforated bottom is for the purpose of cleaning or sweeping the moths and other injurious insects from the hive. The box or drawer E is provided with slats running transversely from side to side of the said box and secured thereto. Immediately over the drawer E is another perforated bottom, H, and directly over the perforated bottom H is another slide, F, which slides out and in, and is provided with a handle, G, to facilitate that purpose. I is a box or case, cubic in form, in one side of which is a glass. Any number of these boxes may be placed in the hive and over the perforations in the bottom H, so the bees may have free access to deposit their honey therein. J is the cap that covers the main body of the hive, and is made so as to shut down past the outside, so as to protect the inside from storms beating into the inside of the hive.

It will be seen that my invention is of great importance from the fact of its simplicity and cheapness and durability and economy.

The bees enter the hive in the opening made by the rabbet c, and when the lower apartment is full the slide F is removed, and they ascend through the openings in the bottom or partition H, into boxes I, in which they can deposit their honey.

When it becomes necessary to remove the moths or other insects from the hive, the bees are driven into the upper apartment, and kept there by putting in the slide F, and by removing the said slide the bees can return at will.

Having thus described my invention, what I claim as new, and desire to secure by Letters Patent of the United States, is—

The combination of the rabbeted sliding partition B, perforated bottom D, slats E, perforated bottom H, slide F, and box I with box A, substantially as described, for the purpose specified.

The above specification of my invention signed by me this 4th day of May, 1866.

MOSES GUTHRIE.

Witnesses:
J. C. FREELAND,
S. M. GRAY.